United States Patent [19]

Thomas et al.

[11] Patent Number: 5,182,684
[45] Date of Patent: Jan. 26, 1993

[54] ESTIMATOR POSITIONING SYSTEM AND METHOD

[75] Inventors: Vincent P. Thomas, Chandlers Ford; Peter Baker, Locksheath, both of England

[73] Assignee: International Business Machines Corporation, Armonk, N.Y.

[21] Appl. No.: 585,057
[22] PCT Filed: Mar. 8, 1989
[86] PCT No.: PCT/GB89/00231
 § 371 Date: Nov. 6, 1990
 § 102(e) Date: Nov. 6, 1990
[87] PCT Pub. No.: WO90/10930
 PCT Pub. Date: Sep. 20, 1990
[51] Int. Cl.[5] .............................. G11B 5/55
[52] U.S. Cl. .................. 360/78.09; 360/78.06; 360/78.08
[58] Field of Search ............. 360/78.08, 78.09, 78.12, 360/78.06

[56] References Cited

U.S. PATENT DOCUMENTS

| 3,495,145 | 2/1970 | Sordello et al. | 318/18 |
| 3,736,485 | 5/1973 | Scarrott et al. | 318/594 |
| 4,488,098 | 12/1984 | Shimonou | 318/561 |
| 4,679,103 | 7/1987 | Workman | 360/77 |
| 4,792,870 | 12/1988 | Pinson | 318/561 X |

FOREIGN PATENT DOCUMENTS

| 0013326 | 7/1980 | European Pat. Off. | 360/78 |
| 0103493 | 3/1984 | European Pat. Off. | 318/561 |
| 0249020 | 12/1987 | European Pat. Off. | 318/561 |
| 0263962 | 4/1988 | European Pat. Off. | 360/78 |
| 2166889 | 5/1986 | United Kingdom | 318/561 |

Primary Examiner—Joseph L. Dixon
Assistant Examiner—David L. Robertson
Attorney, Agent, or Firm—Robert W. Lahtinen; Roy W. Truelson

[57] ABSTRACT

A system and method for controlling the movement of a member, particularly the heads of a disk file, to a specified position in a predetermined path, makes use of an electromagnetic responsive to control signals and to position reference information and a transducing means for reading such information to produce a position signal. The position signal is sampled regularly and, together with the actuator control signal, used to update a velocity estimator. During the deceleration phase of the movement, a new actuator control signal is generated at each sample time from the square of the estimated velocity divided by the computed distance-to-go to the specified position.

13 Claims, 2 Drawing Sheets

ESTIMATOR POSITIONING SYSTEM AND METHOD

TECHNICAL FIELD OF THE INVENTION

This invention relates to a system and method for controlling the movement of a member to a specified position by means of an estimator and in particular to the positioning of the heads of a disk file.

BACKGROUND OF THE INVENTION

One aspect of the positioning of the heads of a disk file to read or write data on information bearing tracks thereof is the so-called 'seek' movement between tracks. It is generally desirable to move the heads in the minimum time consistent with minimum final position error and settle time prior to entering the track following mode in which data may be read or written. Track following relies on the provision of position reference information, frequently referred to as "servo patterns", on at least one disk surface. The position reference information may either be on a dedicated servo surface and read by a dedicated servo head or it may be dispersed as servo sectors on the data surfaces and read by the data heads. Generally, the position reference information does not give an absolute position of the head but only an offset position relative to a single track or within a small group of tracks. The seek operation conventionally uses this information to update a register containing either the absolute position or the number of tracks to go to the target track.

The seek movement normally consists of an accelerate phase in which the heads are accelerated as fast as possible in an open loop fashion followed by a decelerate phase in which they are decelerated under some sort of closed loop control to come to rest approximately on the target track. There may also be an intermediate 'coast' or constant velocity phase between the accelerate and decelerate phases. Conventionally, the control of deceleration has been achieved by measuring or estimating head velocity and causing it to track a velocity profile. The velocity profile may be calculated on the basis of the square root of the distance-to-go as described in an article by R. E. Oswald entitled "Design of a Disk File Head-Positioning Servo" (IBM Journal of R and D Nov. 1974, pp. 506–512). Alternatively, the profile may be stored in a table which is addressed by the number of tracks to go. One such system is described in EP 0111654 A1.

A recent development in the control of disk file head movement has been the use of sampling of the digitized position error, derived from the position reference information in combination with state estimation control theory as described in "Digital Control of Dynamic Systems" by Franklin and Powell (Addison-Wesley, 1980). U.S. Pat. Nos. 4679103 and 4697127 describe such systems employed in disk files, in which state variables, defined by a mathematical model of the positioning system, are updated at each sampling time by a state estimator. The inputs to the estimator are position error and the currently applied actuator control signal. One output is a velocity estimate which, in the seek mode, is compared with a velocity profile such as in the earlier servo systems.

An ideal actuator is a double integrator system where current in the coil is integrated over time to give velocity, and velocity is integrated to give position. For the case of an ideal actuator with a driver limited to $\pm I$ amps, the minimum decelerate time is achieve by applying the full decelerate current at a critical distance to go. This distance will then reduce parabolically finally reaching the required position with zero velocity. The ideal velocity profile is thus given by $$v_t = (2XIK_f/M)^{\frac{1}{2}}$$

where $v_t$ is the optimum velocity for a given distance-to-go, $X$; $M$ is the mass of the system and $K_f$ is the force constant of the actuator.

In the prior art implementations the servo has this ideal trajectory or velocity profile, either in a table lookup form or else calculates it on the fly. At each sample time or track crossing, it compares the actuator's velocity and remaining distance to go with the ideal trajectory and increases the drive current to the actuator if the actuator's velocity is above the velocity given by the ideal trajectory for that distance to go, and reduces it if the actuator's velocity is low.

In choosing between table lookup or calculation "on the fly", a trade off must be made between the large code space required for a table with adequate resolution and the length of time required to calculate a square root, an iterative process. Some table lookup algorithms, such as that of EP 0111454 A1, use a compacted table but take more time in accessing the table.

Additionally, four more factors also complicate the situation:

1) If the actuator velocity is found to be greater than the trajectory velocity, the drive needs to be increased Consequently the trajectory must be based on a drive level somewhat less than the full drive available to allow serving actions on a worst case file, typically this is 75%.
2) Due to the time constant of the actuator coil and driver electronics, there will be a delay in applying and removing the force on the actuator. Some form of anticipation is required in deciding when to reverse the drive as the trajectory is approached and also in deciding when to remove the drive and hand over to the settle algorithm.
3) At the final position, there is an extremely high rate of change of current (limited only by the rise time of the coil) and the consequent jerk or rate of change of force can cause problems with resonances in the mechanical system.
4) If the error signal that is generated to apply to the driver is based on the simple approach outlined above, i.e. the servo loop gain factor, $K_d$, times the difference between the actuator velocity, $v_a$, and the trajectory velocity, $v_t$, then, since the error required to produce the drive level implicit in the trajectory is constant, nominally $1/K_d$, the error in percentaqe terms increases as the velocity reduces, becoming unacceptable as zero velocity is approached. To compensate for this, either the trajectory can be distorted to allow for the error required or a feedforward current can be added into the error term. However, these solutions introduce further complexity to the system.

DISCLOSURE OF THE INVENTION

Many of the above referenced problems, occurring with velocity profile control as practised in the prior art are overcome in accordance with the present invention which provides a method of controlling the movement of a member in a positioning system to a specified position in a predetermined path along which the member is movable by an actuator in response to actuator control signals, said movement comprising at least acceleration and deceleration phases, the system further including position reference information and transducing means capable of reading such position reference information to produce a signal indicative of the relative position of the member, the method comprising the steps of sampling the signals from the position transducing means at regular sampling times, computing the distance-to-go to the specified position; estimating the velocity of the member at each sampling time in accordance with a mathematical model of the system and in response to at least the current position signal sample and actuator control signal; generating, during said deceleration phase of movement, an actuator control signal based on said velocity estimate and distance to go; applying the generated actuator control signal to the actuator and repeating the above steps at successive sample times until the member is within a predetermined distance of the specified position; characterized in that the actuator control signal is calculated at each sample time during said deceleration phase of movement as a function of the square of the estimated velocity divided by the distance-to-go.

The invention also provides a positioning system including an actuator for moving a member to a specified position along a predetermined path in response to actuator control signals, the movement comprising at least acceleration and deceleration phases; position reference information associated with the path of movement; transducing means capable of reading such position reference information and producing signals indicative of the relative position of the member; sampling means for sampling the relative position indicating signals at regular sampling times; means for computing the distance-to-go to the specified position; a velocity estimator for estimating the velocity of the member at each sample time on the basis of a mathematical model of the positioning system and in response to at least the current position sample and actuator control signal; and means for generating, at each sample time during said deceleration phase of movement, an actuator control signal, based on said velocity estimate and distance to go, and for applying the generated actuator control signal to the actuator; characterized in that:- the actuator control signal generated by said generating means during said deceleration phase of movement is calculated, at each sample time, as a function of the square of the estimated velocity divided by the distance-to-go.

The system and method according to the invention have the advantage that no trajectory table is required, giving a saving in code space. Further, the alternative calculation of a square root is avoided giving a saving in time. Taking a square root involves an iterative process and the number of iterations required would have to be that required for the worst case input data. Also, there is no velocity error term ($1/K_d$). This is particularly important as the specified position is approached and control is handed over to a position loop settle algorithm, as a velocity error will give rise to overshoot in the settle phase.

Given the ideal electromagnetic actuator with limited drive current, the minimum time to decelerate is given by applying the full current (or some percentage thereof) throughout the deceleration phase. However, in a real actuator there are benefits to be gained by profiling the decelerate current. One such benefit arises from the fact that the maximum decelerate current is often determined by the supply voltage available and the resistance of the coil. In this case for systems with a large force factor, a greater current is available in the early part of the decelerate period due to the additive effect of back e.m.f. so that the decelerate time is reduced if the current is appropriately profiled. A second benefit arises because, when there are significant resonances in the system, the time from the end of the decelerate phase to the time the settle criteria are met must be considered in conjunction with the decelerate time. If in the final part of the deceleration the current is reduced to zero in a smoother fashion, the jerk can be reduced. Also since the rate of change of velocity has been reduced, the error in the velocity estimate is also smaller. As a result the hand over to the settle algorithm is much better controlled with lower resonance amplitudes and a more accurate velocity estimate. Clearly, this profiling of the current will increase the decelerate time but can result in an overall reduction of the decelerate and settle time.

Such profiling is easily achieved in a preferred method according to the invention by computing the actuator control signal to exceed by a predetermined factor the minimum actuator control signal needed to bring the head to rest at the specified track.

This modification involves adjusting the constant $K_f/M$, which is used in the preferred calculation of actuator control signal (current), where $K_f$ is the force constant of the actuator and M is the mass of the moving system. If $K_f/M$ is multiplied by a constant, $K_o$, typically in the range 0.8 to 0.95, the control signal delivered to the actuator will be an overestimate. As a result, at the next sample time the ratio, $\hat{v}^2/X$, where v is the velocity estimate and X is the distance-to-go, is reduced. However, since the new value of control signal is also an overestimate, at the following sample the control signal will reduce again, and so on. This is implemented by the following calculation at each sample time:

$$U = M\hat{v}^2 / 2K_f K_o X$$

where U is the actuator control signal, representative of drive current and $K_o$ is the overestimation factor.

It will be noted that $2K_f K_o/M$ is a constant and therefore does not need to be calculated at each sample time. Careful choice of the overestimation factor and the critical distance to go give rise to a decelerate current profile that can both take advantage of the back emf available and reduce the jerk at the end of the decelerate phase.

In the above calculation, the distance-to-go, X, is preferably calculated using the actual measured position signal from the transducing means although it would be possible for a position estimate to be used. In practice, only the change in position is calculated and is used to modify the distance-to-go at each sample time.

In the same way that the velocity and required actuator control signal are computed at each sample time during the decelerate phase, the critical distance-to-go, $X_{cr}$, at which the decelerate phase is to start is computed at each sample time during the acceleration and coast phases. The computation is broadly based on the square of the estimated velocity signal, v, divided by the maximum available actuator current at that velocity. As soon as the computed distance to go is less than $X_{cr}$ the system is switched into its decelerate phase. With an electromagnetic actuator, the maximum current available increases with velocity because of back e.m.f. The slew rate of current in the actuator is also, preferably, included in the computation of $X_{cr}$. $X_{cr}$ can be shown to be dependent on $K_f$, which is the plant gain, and on velocity. As a result, when the plant gain Is low, $X_{cr}$ is increased, allowing the extra time to stop within the constraints of the given current profile. Thus, the worst case plant affects only its own performance and the best improves on the nominal.

Although, the invention is particularly applicable to a magnetic disk file head positioning system for positioning heads relative to information storage tracks on the disk, it is also applicable to any other precision positioning system employing an actuator. Optical disk files, printer print head movements and robotic manipulators are all alternative examples where minimum time of movement to a new position is important.

In the disk file application, the file would include at least one disk provided with, preferably dedicated, position reference information on a surface thereof and the transducing means would comprise at least one of the heads, preferably a dedicated servo head, and demodulating means for demodulating signals read back by the servo head to provide position indicating signals relating to position in a radially repeated subset of the information storage tracks.

BRIEF DESCRIPTION OF THE DRAWINGS

The invention will now be described, by way of example only, with reference to the following drawings, in which.

DETAILED DESCRIPTION OF THE INVENTION

Figure 1:
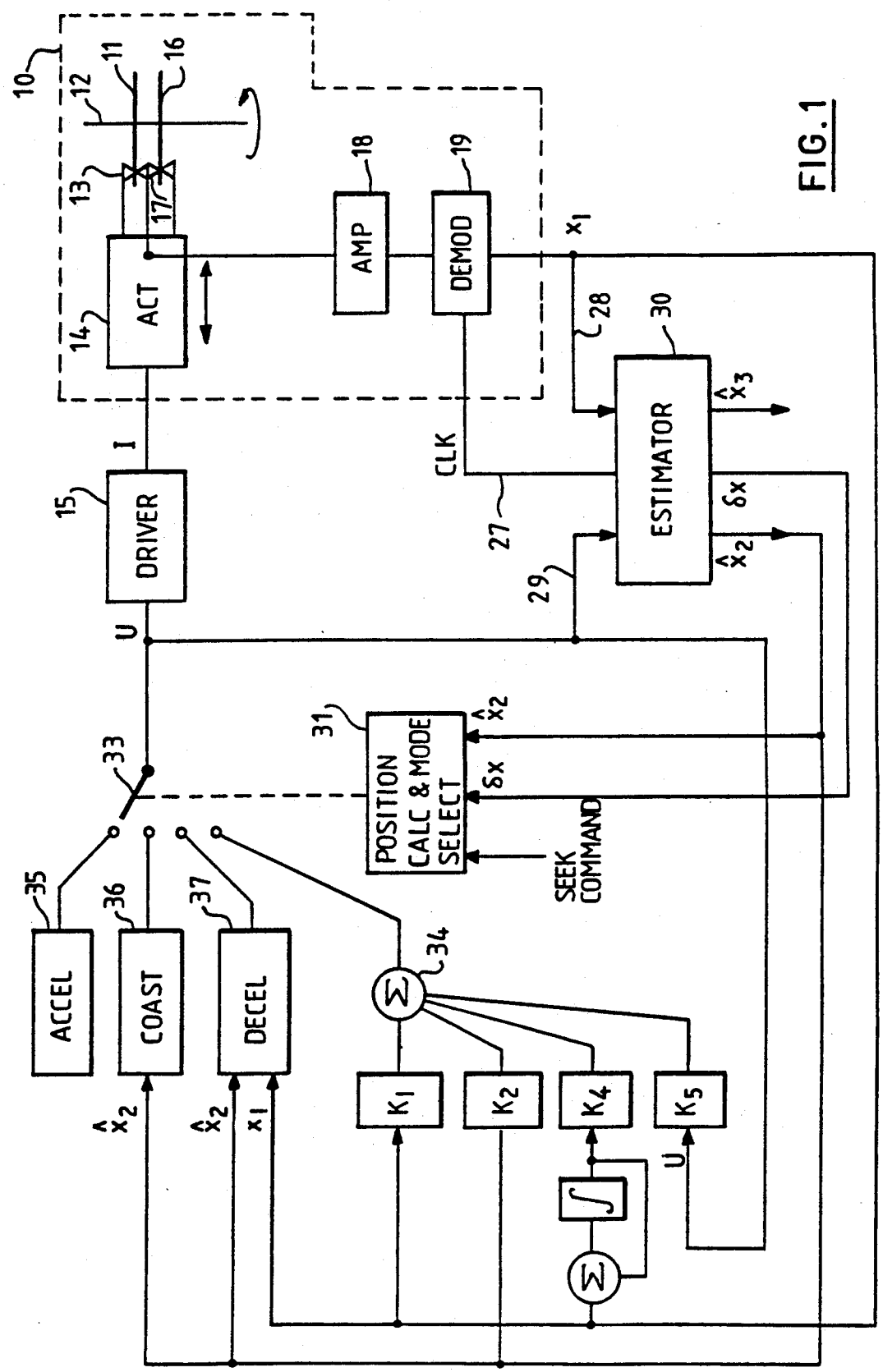
FIG. 1 is a schematic block diagram of a head positioning system according to the invention for positioning the heads of a disk file.

The disk file head positioning system illustrated schematically in FIG. 1 includes both real mechanical and electrical components and also various functional blocks which are implemented in microcode under the control of a microprocessor. It should be realized that such functional code blocks only exist as modules of code and are not physically separate components.

Considering first the hardware, the disk file comprises mechanical and electrical components 10, which may be regarded as the "Plant" from the point of view of control theory, and various electrical circuits A number of information bearing disks, such as 11, are rotatable on spindle by a motor (not shown). Information may be written on or read from the disks by means of heads such as 13 which are positioned by means of an actuator 14 of the well-known voice coil motor type. The actuator moves in response to current from a voltage driver 15 which receives an actuator control voltage signal, U, generated by the microcode.

Figure 2:
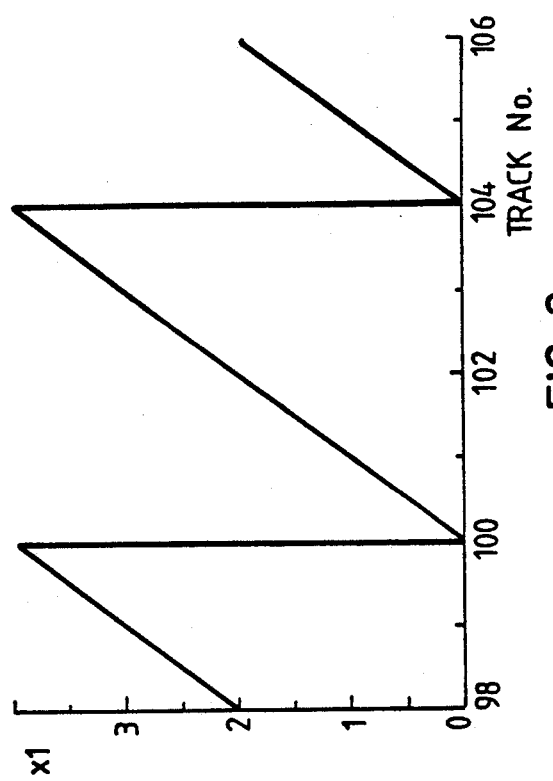
FIG. 2 illustrates the nominal variation of a head position indicating signal produced in the system of FIG. 1 relative to groups of tracks in a disk file.

The file is of the dedicated servo type and one of the disks 16 has a surface bearing servo patterns constituting position reference information for a dedicated servo head 17. Signals from the servo head are amplified by amplifier 18 and demodulated by demodulator 19 to produce a position error signal, $x_1$. The signal, $x_1$ is a digital signal which gives the position of a servo head within a group of four tracks which are repeated radially over the dedicated surface of disk 16. The nominal variation of such a position error signal with track position is illustrated in FIG. 2.

Although not strictly necessary to an understanding of the invention, it may be helpful to explain that the servo pattern is a multi-burst phase modulated pattern, such as is shown in FIG. 7 of U.S. Pat. No. 4,549,232 entitled "Phase Modulated Servo System". Thus, the dedicated servo surface of disk 16 is divided circumferentially into adjacent sectors, each of which contains a servo identifier (SID) at the start of the sector and a servo pattern, constituting the position reference information within the sector. Within the servo pattern of each sector, servo information is recorded in three circumferentially spaced fields, in each of which bursts of recorded transitions are staggered progressively according to which one of the group of four tracks they are in. The staggering of the first and third fields is in the same circumferential direction whereas the staggering of the second field is in the opposite circumferential direction. The servo head 17 in FIG. 1 is two tracks wide and its output is two multiplexed approximate sinusoids whose phase difference is indicative of the radial position within the group of tracks. This signal, as amplified by amplifier 18, is applied to the demodulator 19 of FIG. 1.

The demodulation of the signal by detection of its two phases relative to a reference phase is generally described in U.S. Pat. No. 4,549,232 but a more detailed description of how the phase modulation is converted to a precision digital output may be found in U.S. Pat. No. 4,642,562 entitled "Phase Difference Demodulator". Briefly, this involves detecting the phase difference initially as a combination of a digital signal and an analog remainder. The digital signal gives the most significant bits of the PES. The analog remainder is separately digitized to provide in total an eleven bit PES of which the two most significant bits indicate track type within the four possible types and the remaining nine bits indicate fractional position within a track.

Having, thus described the hardware portion of FIG. 1, the remaining blocks will now be identified in terms of their function in relation to the operation of the positioning system. As mentioned above, these blocks are embodied as microcode in a commercially available microprocessor (Texas Instrument TMS 320C25) and associated internal and external memory.

At the heart of the system is a state estimator 30, which receives as inputs at regular predetermined sampling times, k, determined by a clock input on line 27 from demodulator 19, the current digital values of position error signal, $x_1(k)$ on line 28, and of the actuator control signal $u(k)$ on line 29. The sample clock is generated in response to the occurrence of the SID patterns under the servo head 17 at the start of each sector as detected by demodulator 19. In response to these inputs, the state estimator produces a velocity estimate, $x_2$ and a bias estimate, $x_3$, neither quantity being directly measurable by the hardware of the system. The bias estimate $x_3$ relates to such quantities as windage and actuator cable tension and is discussed in further detail in U.S. Pat. No. 4,697,127. The derivation of the velocity estimate will be described further below.

The velocity estimate, which is initially zero, is applied together with a position change signal, $\delta x$, to a position calculator and mode selector 31. The mode selector also receives a seek command from a control processor (not shown) to initiate a seek movement to another track. The seek command includes the track number of the target track. Initially, on power-up, the heads are positioned on track zero which is held in a register in the position calculation section of block 31. In response to a seek command the value of this register is changed to the target track number defined by the seek command.

The mode select portion of block 31 operates a switch 33 to step the system through its various modes and phases. Preceding the Seek mode, the system is in Track Follow mode and the switch 33 is connected to summing junction 34. This sums a proportion, $K_1$, of the position error, $x_1$, with a proportion, K, of integrated position error and also with a proportion, $K_2$, of estimated velocity, $x_2$, and a proportion, $K_5$ of actuator current, u. This equates to a conventional proportional—integral—derivative arrangement for controlling a position loop with delay compensation.

Figure 3:
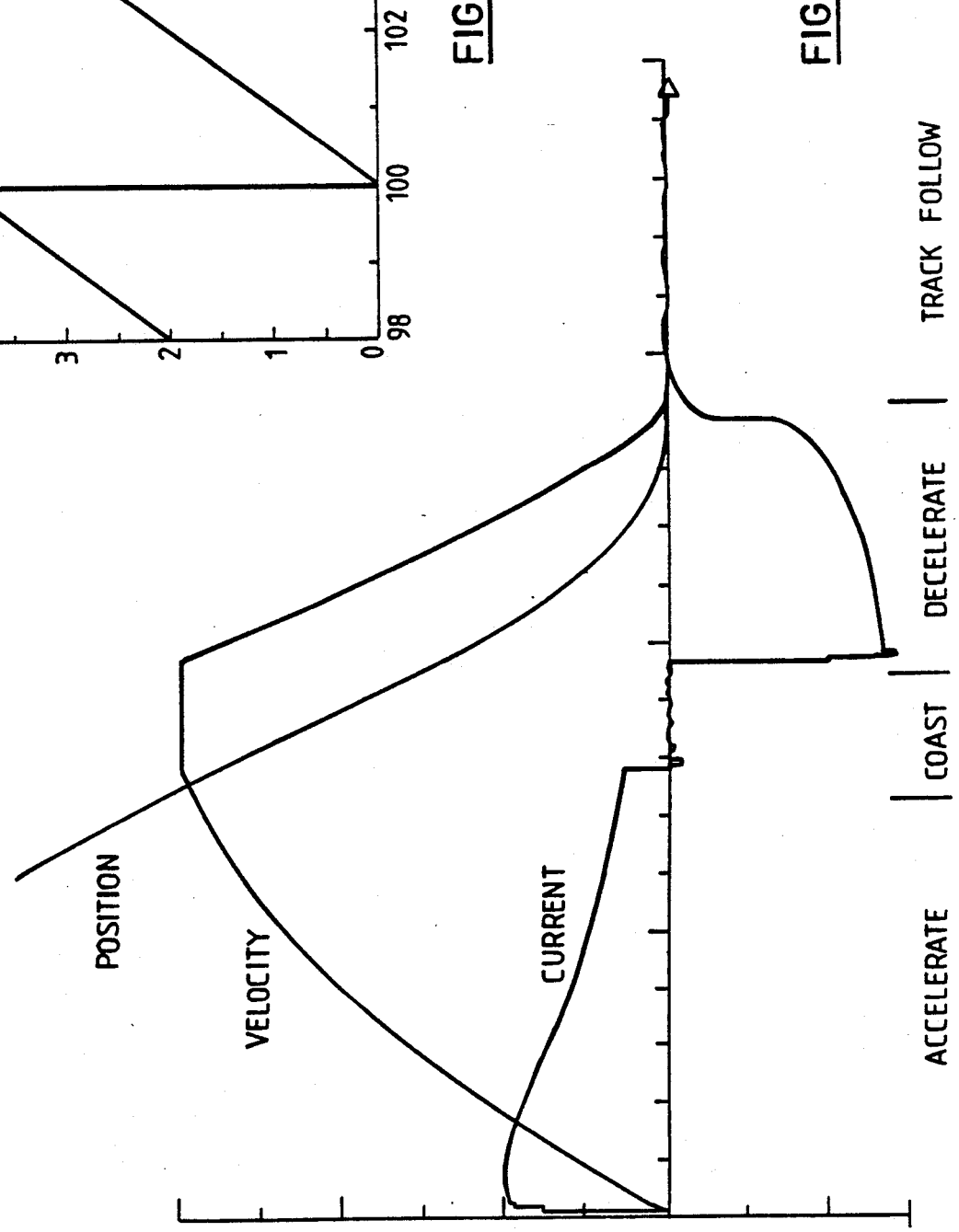
FIG. 3 illustrates the variation of actuator current, head position and velocity during a typical seek movement of the head in the system of FIG. 1.

On receipt of the seek command, if the seek is for more than seven tracks, the mode selector 31 sets switch 33 to the output of an Accelerate controller, 35 which applies maximum current, in open loop fashion, to cause the actuator to accelerate the heads as fast as possible towards the target track. As shown in FIG. 3, the current is initially a maximum but then reduces somewhat because of the effects of back e.m.f. in the actuator coil as the actuator picks up speed.

If a predetermined velocity is reached, the mode selector switches switch 33 to Coast controller 36. This controls the estimated velocity, $x_2$, in closed loop fashion to a constant predetermined value. The coast mode is represented in FIG. 3 by the flat topped portion of the velocity curve.

During Accelerate and Coast phases the mode selector constantly computes the critical distance to go, at which deceleration must start if the head is to be brought to rest on the specified track, from the velocity estimate and from various stored constants. When this distance is reached, the mode selector switches switch 33 to Decelerate Controller 37 which causes deceleration of the actuator in accordance with the invention.

Finally, when the mode selector determines that certain criteria are met it reverts to the Track Follow mode, the initial part of which is a settle phase, a description of which is not relevant to an understanding of the present invention.

Seeks of less than seven tracks are handled under stepped position loop control in Track Follow Mode. This type of short seek is not the subject of the present invention.

The function of the various code blocks in the system of FIG. 1 will now be described in more detail. At the heart of the system is the state estimator 30 which is of the type known as a reduced order current estimator.

Estimators are used in servo design to estimate the various states of a system (e.g velocity and bias forces) which it is either impossible or not economic to measure. They are sometimes used to estimate states that are measured where the measurement is too noisy to use directly. There are two main categories of estimators: predictive estimators, in which the estimate for the states at the present time is based on the measured and estimated states from the previous sample time, and current estimator in which the estimate is based on the measurements and predictions made for the current sample time.

In a servo system using a current estimator, such as estimator 30, after some initial time critical calculations a number of further calculations are performed in preparation for the next sample time. These calculations predict the values of the states of the system at the next sample time. When the next sample occurs the predictions of the measured states are compared with the actual measured values and a correction factor is generated. This correction factor, called a residual, is applied in varying degrees to the predictions of the unmeasured states to give the final estimates that are used.

In the present system, a force is applied to a mass, the actuator, giving, in simplest case, two states that of velocity and position. The system can be described by first order differential equations as follows:

$$x_1(t) = x2(t)$$

$$x_2(t) = nu(t)$$

where
  $x_1$ = position;
  $x_2$ = velocity, meters/sec;
  u = control, amps;
  $n = K_f/M$
where $K_1$ = force constant, N / amp, and M is in Kilogrammes.

Given a fixed sampling rate these equations can be converted to discrete time difference equations:

$$x(k+1) = \Phi x(k) + \Gamma u(k)$$

where $$x = \begin{bmatrix} x_1 \\ x_2 \end{bmatrix}$$

The matrices $\Phi$ and $\Gamma$ when normalised to sample time and track pitch are $$\Phi = \begin{bmatrix} 1 & 1 \\ 0 & 1 \end{bmatrix}$$

$$\Gamma = \begin{bmatrix} \Gamma_1 \\ \Gamma_2 \end{bmatrix}$$

where $$\Gamma_1 = K_f T_{pm} T^2 / 2M$$

and $$\Gamma_2 = 2\Gamma_1$$

and where $T_{pm}$ = trackpitch, tracks per meter, and T = sample period

These equations can be used to build an estimator to predict the states at the next sample given the present estimate x(k) of the states and the input current u(k) according to the following equation:

$$\bar{x}(k+1) = \Phi x(k) + \Gamma u(k) \quad (2)$$

To be effective, an estimator needs to compare its prediction of the states with the values of those states measured and generate a correction to this prediction of the states. By this means any errors in the initial estimates of the states can be made to reduce to zero, and inadequacies of the model of the plant can be tolerated. To do this we generate the residual, which for the actuator example is $$\text{Residual}(k+1) = x_1(k+1) - \bar{x}_1(k+1) \quad (3)$$

where $\bar{x}_1(k+1)$ is the predicted position at sample $k+1$, ignoring delay compensation, given by:

$$\bar{x}_1(k+1) = x_1(k) + \Gamma_1 u(k) \quad (4)$$

The number of calculations can be minimized by using a reduced order estimator in which no estimate, $x(k+1)$ is made of the measured states, the measured value being used instead. State estimator 30 is such a reduced order estimator in respect of position and equation (4) for the prediction of the next position $\bar{x}_1$ simplifies to $$\bar{x}_1(k+1) = x_1(k) + x_2(k) + \Gamma_1(u(k)) \quad (5)$$

as the position is the measured value and not estimated.

In similar fashion, the predicted velocity at sample $k+1$, is given by:

$$x_2(k+1) = x_2(k) + \Gamma_2(u(k) + x_3(k)) \quad (6)$$

The Residual is used to correct the prediction of the states to give estimates, as follows:

$$x_2(k+1) = \bar{x}_2(k+1) + L_2 \text{Residual}(k+1) \quad (7)$$

$$x_3(k+1) = \bar{x}_3(k+1) + L_3 \text{Residual}(k+1) \quad (8)$$

where $L_1$, $L_2$ and $L_3$ are constants determining the speed of response of the estimator to errors and determine the proportion of the Residual which is added to correct the previous prediction of position or velocity as the case may be. Because the actual measured position is available, no estimate of $x_1$, is made.

The estimator 30 carries out the precalculations (3), (5) and (6) between samples and at every sample time makes the time critical estimation calculations (7) and (8).

Considering equation (5), the second and third terms sum to give the prediction of change in position, i.e delta position. So if, in this precalculation, this sum is saved as:

$$\delta x_1(k+1) = x_2(k) + \Gamma_1(u(k) + x_3(k)) \quad (9)$$

then the residual correction can be applied to give:

$$\delta x_1(k+1) = \delta x_1(k+1) + \text{Residual}(k+1) \quad (10)$$

which is the change in position of the actuator.

This can be shown by expanding the last equation.

$$\delta x_1(k+1) = x_2(k) + \delta_1(u(k) + x_3(k)) + x_1(k+1) - \bar{x}_1(k+1)$$

expanding $\bar{x}_1(k+1)$ gives $$\delta x_1(k+1) = \delta_1(u(k) + x_3(k)) + x_1(k+1) - (x_1(k) + x_2(k) + \delta_1(k) + x_2(k) + \delta_1(u(k) + x_3(k)))$$

giving the required result
$$\delta x_1(k+1) = x_1(k+1) - x_1(k)$$

Calculation of delta position enables the distance-to-go to the target track to be updated at each sample time for the purpose of calculating the required decelerate current. It will be noted that the delta position calculation does not impose any restriction of the seek velocity provided that there is no ambiguity in the generation of Residual. This is a function of the accuracy of the model of the system and the noise in the measurement. This restriction clearly must be met for the estimator itself to function correctly.

The calculations described above are carried out by the state estimator 30 between and at every sampling time, during all phases of the Seek mode of the head positioning system (and also in the Track Follow mode).

During a seek, various specific calculations are carried out by Position Calculate and Mode Select Block 31 and the phase controllers 35, 36 and 37. These calculations are best described in the context of the overall Seek Algorithm which is set out below. The steps of the algorithm are labelled (a)–(1) and explanatory comments have been included.

SEEK ALGORITHM

Initialization—(Block 31)

a) ttg←|target track no. - current track no.|
   where ttg is the number of tracks to go and the target track number is specified by the seek command.
   Dirn→sign (target track no - current track no.)
   where Dirn is the direction of the seek
c) If ttg>7, enter Accelerate mode

Sampling—(State estimator 30)

d) get PES $x_1(k)$ (from demodulator 19)
e) ResIdual ←$(x_1(k) - \bar{x}(k))$, modulo 4

Position Calculation (Block 31)

f) $\Delta$position←$\Delta$position+Residual
g) ttg←ttg+$\Delta$position . Dirn
   where Dirn= −1 inward seek and +1 for outward seek

Estimation (state estimator 30)

h) $x_2(k)$←$\bar{x}_2(k) + L_2 \text{Residual}$ i) $x_3(k)$←$\bar{x}_3(k) + L_3 \text{Residual}$

Seek mode control (Block 31)

j) if mode=accelerate
   and if ttg<$2x_2(k)S + x_2^2(k)$ / $[2\Gamma_2(I_O + I_v x_2(k))]$
   then mode←decelerate
   where $I_O$=max current available at zero velocity,
   $I_v$=extra current available per unit velocity,
   and S is a constant determined by the actuator driver slew rate
   else if $|x_2(k)| > 0.941$ X coast velocity then mode←coast
l) if mode=coast
   and if ttg<$x_2(k)S + x_2^2(k)$ / $[2\Gamma_2(I_O + I_v x_2(k))]$
   then mode←decelerate Accelerate mode control (accelerate controller 35)

if mode=accelerate then $u(k)=U_o$ where $u(k)$ is actuator current control and $U_o$ is a fixed accelerate current, corresponding to the maximum current $I_o$.

Coast mode control (coast controller 3S)

if mode=coast
then $u(k)=K_c(x_2(k)-V_c)$
where $V_c$ Is the predetermined coast velocity Decelerate mode control (Decelerate controller 37)

if mode=decelerate
then $u(k)=x_2^2/\text{ttg } K_O\Gamma_2$

Seek termination (Block 31)

if ttg<0.25 track
or ttg<1.0 and<0.125 tracks/sample then mode =Track follow (settle)

We claim:

1. A method of controlling the movement of a member in a Positioning system to a specified position in a predetermined path along which the member is movable by an actuator in response to actuator control signals, said movement comprising at least acceleration and deceleration phases, the system further including position reference information and transducing means capable of reading such position reference information to produce a signal indicative of the relative position of the member, the method comprising the steps of
   sampling the signals from the position transducing means at regular sampling times;
   computing the distance-to-go to the specified position;
   estimating the velocity of the member at each sampling time in accordance with a mathematical model of the system and in response to at least the current position signal sample and actuator control signal;
   generating, during said deceleration phase of movement, an actuator control signal based on said velocity estimate and distance to go;
   applying the generated actuator control signal to the actuator and member is within a predetermined distance of the specified position;
   characterized in that the actuator control signal is calculated at each sample time during said deceleration phase of movement as a function of the square of the estimated velocity divided by the distance-to-go.

2. A method as claimed in claim 1 in which the computed actuator control signal exceeds by a predetermined factor the minimum actuator control signal needed to bring the head to rest at the specified position.

3. A method as claimed in claim 2 in which the actuator control signal, U, is computed according to the expression $$U = Mv^2/2K_fK_oX$$

where v is the estimated velocity, X is the computed distance-to-go, M is the mass of the moving components of the system, $K_f$ is the force constant of the actuator and $K_o$ is the reciprocal of said predetermined factor.

4. A method is claimed in claim 3 in which $K_o$ is in the range 0.8–0.95.

5. A method as claimed in claim 2 in which the distance-to-go to the specified position is computed from the position signal produced by the transducing means.

6. A method as claimed in claim 5 where the actuator is an electromagnetic actuator in which a drive current is produced in response to the actuator control signals, the method including determining, at each sample time prior to the deceleration phase, a critical distance-to-go dependent on the square of the estimated velocity divided by the maximum actuator current available at the estimated velocity, comparing the computed distance to go with the critical distance-to-go and, if the computed distance to go is less than the critical distance-to-go, switching the system into its deceleration phase.

7. A method as claimed in claim 6 in which the critical distance-to-go is further determined by the slew rate of current in the actuator.

8. The method of claim 1, wherein said positioning system is used to position one or more heads of a disk file with respect to a plurality of concentric information bearing tracks.

9. The method of claim 8, wherein said step of estimating the velocity of a member comprises the steps of:
   computing an initial estimated relative position of said member corresponding to a sample period k+1 from state parameters corresponding to the previous sample period k;
   computing an initial estimated velocity of said member corresponding to a sample period k+1 from stage parameters corresponding to the previous sample period k;
   generating a residual, said residual being equal to the difference between said relative position of said member at sample period k+1 and said computed initial estimated relative position; and
   generating a final estimated velocity of said member from said initial estimated velocity and said residual.

10. A positioning system including an actuator (14) for moving a member (13, 17) to a specified position along a predetermined path in response to actuator control signals, the movement comprising at least acceleration and deceleration phases;
   position reference information associated with the path of movement;
   transducing means (17, 19) capable of reading such position reference information and producing signals indicative of the relative position of the member (13, 17);
   sampling means (28, 29) for sampling the relative position indicating signals at regular sampling times;
   means (31) for computing the distance-to-go to the specified position;
   a velocity estimator (30) for estimating the velocity of the member at each sample time on the basis of a mathematical model of the positioning system and in response to at least the current position sample and actuator control signal; and
   means (37) for generating, at each sample time during said deceleration phase of movement, an actuator control signal, based on said velocity estimate and distance-to-go; and for applying the generated actuator control signal to the actuator, characterized in that:
   the actuator control signal generated by said generating means during said deceleration phase of movement is calculated, at each sample time, as a function of the square of the estimated velocity divided by the distance-to-go.

11. A positioning system as claimed in claim 10 for positioning the heads (13, 17) of a disk file relative to information storage tracks on the disks (11) thereof, the actuator being an electromagnetic actuator in which a drive current is produced in response to the actuator control signals, the disk file including at least one information storage disk (16) provided with said position reference information on a surface thereof and said transducing means comprising at least one of said heads (17) and a demodulating means (19) for demodulating signals read back by said at least one head to provide said position indicating signals indicative of the relative position of the head relative to a radially repeated subset of the information storage tracks.

12. A position system as claimed in claim 11 in which said at least one information storage disk has a dedicated servo surface bearing said position reference information and said at least one head is a dedicated servo head for reading said position reference information.

13. The positioning system of claim 11, wherein said velocity estimator comprises:
- means for computing an initial estimated relative position of said member corresponding to a sample period $k+1$ from state parameters corresponding to the previous sample period k;
- means for computing an initial estimated velocity of said member corresponding to a sample period $k+1$ from state parameters corresponding to the previous sample period k;
- means for generating a residual, said residual being equal to the difference between said relative position of said member at sample period $k+1$ and said computed initial estimated relative position; and
- means for generating a final estimated velocity of said member from said initial estimated velocity and said residual.

* * * * *

UNITED STATES PATENT AND TRADEMARK OFFICE
CERTIFICATE OF CORRECTION

PATENT NO. : 5,182,684

DATED : January 26, 1993

INVENTOR(S) : Vincent P. Thomas and Peter Baker

It is certified that error appears in the above-identified patent and that said Letters Patent is hereby corrected as shown below:

Column 11, Line 46, Replace "Actuator and member is within a predetermined" with -- actuator; and repeating the above steps at successive sample times until the member is within a predetermined --

Signed and Sealed this

First Day of February, 1994

Attest:

BRUCE LEHMAN

*Attesting Officer*    *Commissioner of Patents and Trademarks*